3,775,343
METAL-TELLURIUM-OXYGEN GLASS COMPOSITIONS AND METHOD OF MAKING

John A. Ondrey, Tyler, Tex., and Harold E. Swift, Gibsonia, Pa., assignors to Gulf Research & Development Company, Pittsburgh, Pa.
No Drawing. Continuation-in-part of applications Ser. No. 733,312, May 31, 1968, Ser. No. 829,701 and Ser. No. 829,721, both June 2, 1969, and Ser. No. 850,628, Aug. 15, 1969. This application Dec. 20, 1971, Ser. No. 210,145
Int. Cl. B01j 11/32; C07c 57/04
U.S. Cl. 252—439                                               2 Claims

ABSTRACT OF THE DISCLOSURE

Amorphous glass-like compositions of molybdenum, vanadium, tungsten or lead with tellurium and oxygen are made by heating the metal ditelluride with molecular oxygen at an elevated temperature. These resulting compositions are promoters for cobalt molybdate in the catalytic oxidation of propylene and isobutylene.

---

This application is a continuation-in-part of Ser. No. 733,312, filed May 31, 1968, now Patent 3,641,138; Ser. No. 829,701, filed June 2, 1969, now Patent 3,655,749; Ser. No. 829,721, filed June 2, 1969, now Patent 3,655,750; and Ser. No. 850,628, filed Aug. 15, 1969, now Patent 3,660,479.

This invention relates to novel amorphous glass-like compositions of molybdenum, vanadium, tungsten or lead with tellurium and oxygen. These materials are made by heating the metal ditelluride in oxygen to an elevated temperature to oxidize the metal ditelluride. These novel compositions promote the catalytic activity of cobalt molybdate in the oxidation of propylene and isobutylene to acrolein and methacrolein as well as to acrylic acid and methacrylic acid.

Many processes have been proposed for the production of unsaturated aldehydes and acids, particularly acrolein, methacrolein, acrylic acid and methacrylic acid. One method that has been proposed involves the vapor phase oxidation of propylene or isobutene in the presence of molecular oxygen over a cobalt molybdate catalyst. This process results in unsatisfactory yields. A suggested improvement of this process involves the incorporation of tellurium dioxide in the cobalt molybdate as a promoter. Although the yields are improved, this process involves the serious disadvantage that tellurium dioxide is very poisonous and is lost under reaction conditions, i.e. about 450° C. Therefore, the process requires the recovery of the vaporized tellurium dioxide as a safety procedure and it requires the continual replenishment of the catalyst with this tellurium dioxide promoter.

We have unexpectedly discovered a novel composition of tellurium and oxygen with molybdenum, vanadium, tungsten or lead which significantly promotes the activity of cobalt molybdate for the vapor phase oxidation of propylene and isobutene to produce exceptionally high yields of the desired unsaturated aldehydes and unsaturated acids while minimizing the yields of the less desired saturated acids and undesired carbon dioxide. Not only are the yields of desired products exceptionally high, but also the novel promoted catalyst of this invention retains excellent activity over prolonged periods of operation without losing the promoter. Of further advantage is the fact that this novel promoted catalyst can be utilized in this process either unsupported or supported on a suitable carrier.

The novel composition of matter is conveniently prepared by the high temperature oxidation of the ditelluride of molybdenum, vanadium, tungsten or lead using molecular oxygen to form a metal-tellurium-oxygen glass. It is known that certain tellurides such as cobalt telluride decompose at elevated temperatures in the presence of molecular oxygen to the individual oxides such as cobalt oxide and tellurium dioxide; therefore, it is unexpected that these metal ditellurides do not decompose under these conditions to tellurium dioxide and the metal oxide but rather that they form the novel composition of matter of this invention.

The ditellurides of molybdenum, vanadium, tungsten and lead are crystalline materials having distinct and characteristic X-ray diffraction patterns. These metal ditellurides are conveniently utilized in powdered form to assist in their oxidation to the metal-tellurium-oxygen promoter material. In carrying out this oxidation, the metal ditelluride is slowly heated in molecular oxygen, such as air, to an elevated temperature and preferably held at an elevated temperature for sufficient time to complete the oxidation. In this process the substantially, fully oxidized metal ditelluride is converted to a molten mass which solidifies upon cooling to a glass-like material. When this glass-like material is powdered and subjected to appropriate analytical techniques including X-ray diffraction, X-ray fluorescence, neutron activation analysis and differential thermal analysis, it is determined that no metal oxides, metal ditelluride or tellurium dioxide are present and that it is amorphous to X-rays.

This novel composition is prepared by heating vanadium, tungsten or lead ditelluride in the presence of air at a temperature between about 500° C. and about 1000° C. and preferably within the range of about 600° C. to about 900° C. to oxidize the material and heating molybdenum ditelluride in the presence of oxygen at a temperature between about 250° C. and about 700° C. and preferably between about 300° C. and about 650° C. For substantially complete oxidation the time of heating is in part dependent upon the temperature at which oxidation takes place, in general, the higher the temperature used, the less time required for oxidation. The duration of this complete oxidation can be predetermined from prior results or it can be conducted until no further gain in weight is evidenced. The reaction involves a small loss of tellurium as tellurium dioxide, which evolves slowly during the reaction, with a net weight gain as a result of the oxidation. Upon cooling, this molten mass solidifies to a glassy material which is conveniently ground to a fine powder for further use as a catalyst promoter.

Although the substantially completely oxidized metal ditelluride material as described is most preferred as the promotor for cobalt molybdate, a partial oxidation product such as one having a composition within the range of the following table will effectively promote the catalytic properties of cobalt molybdate. The following table sets out the range of composition of the partially oxidized promoter material and the composition of the most preferred fully oxidized glass-like promoter material.

TABLE I

|  | Range wt. percent | | | Fully oxidized wt. percent | | |
|---|---|---|---|---|---|---|
|  | Metal | Te | O | Metal | Te | O |
| Mo | 20–27 | 50–73 | 5–20 | 24 | 57 | 19 |
| V | 20–28 | 38–45 | 28–32 | 26 | 43 | 31 |
| W | 23–29 | 54–57 | 18–22 | 26 | 55 | 19 |
| Pb | 46–60 | 30–40 | 10–15 | 50.65 | 35.6 | 13.75 |

Partially oxidized promoter material, when used in conjunction with cobalt molybdate in the presence of oxygen at an elevated temperature, tends to oxidize to a more fully oxidized state. Additionally, the promoted catalyst can also be formulated by mixing the metal ditelluride with cobalt molybdate and oxidizing the metal ditelluride in admixture therewith to the promoter material.

The catalyst is promoted cobalt molybdate. Cobalt molybdate as used in the claims herein is defined as a compound of molybdenum, cobalt and oxygen having the formula $CoMoO_4$, or it is a mixture of this compound and one or more of the oxides of molybdenum and cobalt, or it can be a mixture of the oxides of molybdenum and cobalt. The exact composition of the cobalt molybdate is controlled to a substantial extent by the procedure used for its preparation. The cobalt molybdate is conveniently and preferably prepared by precipitating the cobalt molybdate from a solution of a cobalt compound and a molybdenum compound. The nature of the cobalt molybdate prepared by such a procedure is determined in part by the conditions utilized and the proportion of the cobalt and molybdenum compounds used. It is preferred that the proportion of cobalt compound to molybdenum compound be adjusted so that the ratio of cobalt to molybdenum in the catalyst is substantially about one to one, although the ratio can vary within moderately wide limits.

The promoted cobalt molybdate catalyst of this invention can conveniently be produced by thoroughly mixing powdered cobalt molybdate as above described and the powdered promoter composition containing the metal tellurium and oxygen and calcining the mixture in air at elevated temperature. For catalytic purposes the promoted catalyst desirably contains from about .1 to about 20 weight percent of the promoter and preferably from about .5 to about 10 weight percent of the promoter. Alternatively, the promoted catalyst can be prepared with substantially equal efficiency by grinding cobalt molybdate with the metal ditelluride in water to form a thick homogeneous paste, drying the mixture and then calcining it in air at the conditions required to oxidize it to the desired promoter composition. In the conversion of the metal ditelluride to the metal-tellurium-oxygen glass promoter material, a definite weight gain is effected. Therefore, the appropriate amount of the metal ditelluride for use in this alternative procedure is readily ascertainable. In the production of these promoted catalysts by these procedures utilizing the metal ditelluride to form the promoter, the promoted catalyst exhibits an X-ray diffraction pattern identical to that of the cobalt molybdate initially used, which fact establishes that the cobalt molybdate is not changed by the procedure and that no metal ditelluride or tellurium dioxide is present in the final product.

In the process for oxidizing the olefin to the corresponding aldehyde and acid, a mixture of the olefin, molecular oxygen, and an inert diluent in the vapor phase are passed over the promoted catalyst at an elevated temperature. Suitable inert diluents such as nitrogen, water vapor, the noble gases, etc., are added to vary the proportion of reactants in the feed stream to control the reaction stoichiometry and to avoid the explosive limits of the feed gas mixture. Since air is a very convenient source of molecular oxygen, the inert diluent can suitable be nitrogen from the air with water vapor added to provide a suitable concentration of the reactants. The hydrocarbon can suitably be from about one volume percent to about 50 volume percent of the feed gas mixture and preferably about five volume percent to about 30 volume percent. The oxygen concentration in the feed gas mixture can be from about three volume percent to about 50 volume percent of the feed gas mixture and preferably from about five volume percent to about 30 volume percent. The ratio of hydrocarbon to oxygen in the feed gas mixture can vary from between about 2.0 to about 0.25 and preferably from about 1.0 to about 0.5.

The highest selectivity to useful products, e.g., acrylic acid, acrolein and less desirably acetic acid in the case of propylene oxidation hereunder, occurs when the promoter is about .5 to five percent of the unsupported catalyst composition and therefore this range is the most preferred for this process. Within this range the total conversion also reaches a maximum, and additionally the selectivity to acrylic acid also is the greatest. As the amount of promoter is increased, the proportion of acrolein increases as well as the proportion of highly undesired carbon dioxide. Since carbon dioxide is the primary undesired by-product, it is desirable to carry out the reaction under conditions which maximize total conversion and selectivity to the desired product distribution and minimize carbon dioxide production. Acetic acid is the least desired of the usable products and in all desirable ranges of operation is a very minor product. These same relations apply in the conversion of isobutene to methacrolein and methacrylic acid.

The conversion, selectivity and product distribution are, in part, a function of the reaction temperature. As the temperature is raised from ambient conditions, the initial reaction although of low conversion is highly selective to the desirable oxygenated products. As the temperature is further increased, the selectivity gradually decreases up to about 500° C. at which the decrease occurs at a more rapid rate. The conversion on the other hand increases and peaks at about 450° C. and then decreases as the carbon dioxide production becomes of greater significance. As a result, the preferred temperature of operation is from about 370° C. to about 550° C. and the most preferred range of temperature for carrying out the process is between about 400° C. and about 475° C. As the temperature is increased in this latter range, the amount of acrolein constantly decreases while that for acrylic acid increases and reaches a maximum of about 475° C. Therefore, the temperature is of significance in establishing not only the conversion and selectivity but also in determining the product distribution.

The space time of the feed gas mixture with the unsupported catalyst, that is, the reciprocal of the gas hourly space velocity, is also of significance with respect to the total conversion, selectivity and product distribution. As the space time is decreased, the selectivity to desirable products increases while the total conversion decreases. Also in decreasing the space time the proportion of aldehyde increases while the proportion of the unsaturated acid and of carbon dioxide decreases. The process for the conversion of the olefin to the unsaturated aldehyde and unsaturated acid can be suitably carried out when a gas hourly space velocity with respect to the olefin of from about 30 to about 480 is utilized and preferably from about 60 to about 180.

The promoted catalyst can be supported on a suitable inert support such as alumina, silica, zirconia, silicon carbide, and the like. In the supported catalyst the same ratio for the cobalt molybdate to the promoter as used in the unsupported catalyst is satisfactory. Unexpectedly, we have discovered that the supported catalyst has a very high selectivity, up to 95 percent or greater with the main product constituting the unsaturated aldehyde and with very little formation of the saturated acid. Therefore, the use of a supported catalyst is particularly suitable in this process for producing the unsaturated aldehyde. When the unsaturated acid is the preferred product, the unsupported catalyst is preferred. A correlation of the catalyst composition, temperature, space velocity and feed gas composition is undertaken to maximize the production of the unsaturated acid, that is acrylic acid or methacrylic acid. When this unsaturated acid is the desired product, the unsaturated aldehyde can be separated from the product mixture and can separately be converted to the corresponding unsaturated acid over the promoted catalyst of this invention or it can conveniently be recycled to the olefin-containing feed gas mixture for conversion to the unsaturated acid.

When the promoted catalyst of this invention is used overextended periods of time, the selectivity and product distribution remain substantially constant. However, the conversion decreases from its initial amount to a lower value. The amount of decrease in conversion over long periods of operation is believed to be a result of polymerization of the unsaturated aldehyde and acid on the catalyst surface. This decline in activity will decrease if the space time is decreased and if the olefin to oxygen ratio is decreased such that a minor loss of conversion over long periods of operating time is experienced. The used catalyst can be readily restored to its initial activity by heating in air at reaction temperature.

The following examples are set out to illustrate the novel processes and compositions of the invention and to provide a better understanding of its details and advantages.

EXAMPLE 1

A two-gram sample of molybdenum ditelluride powder, MoTe$_2$, was slowly heated in a crucible in air to a maximum temperature of 650° C. over a period of about 16 hours and was held at this temperature for an additional six hours. The dark black MoTe$_2$ powder was converted to a dark green mass which was sufficiently fluid at 650° C. to creep slowly when the crucible was tilted. It solidified upon cooling to a glassy material weighing 2.3 grams. The glass was ground to a fine powder and its stoichiometry was determined to be 23.6±1.2 weight percent molybdenum, 57.1±2.9 weight percent tellurium, and the remainder oxygen by X-ray fluorescence using a molybdenum ditelluride standard and by differential thermal analysis. If a free oxide of molybdenum or tellurium were present, it would be expected to be molybdenum trioxide or tellurium dioxide; however, the preparation was carried out at a temperature above the sublimation temperature of molybdenum trioxide and tellurium dioxide. Molybdenum ditelluride and the oxides of molybdenum and tellurium form distinct and characteristic X-ray diffraction patterns. X-ray diffraction analysis of the powdered dark green glassy product disclosed that it was amorphorus to X-rays and that none of the crystalline oxides of molybdenum or tellurium or molybdenum ditelluride or the free elements were detected. The composition was determined to be a chemical combination of molybdenum, tellurium and oxygen.

EXAMPLE 2

A solution of 582 grams of cobalt nitrate and 354 grams of ammonium molybdate was prepared using 1,000 cc. of water. The precipitate obtained by slowly adding 320 cc. of 50 percent ammonium hydroxide to the solution was filtered and washed with cold water, then oven dried at 110° C. for 16 hours. It was then calcined for 24 hours in air at 550° C. and the surface area of the resulting cobalt molybdate was determined to be 3.77 M.$^2$/g. by krypton adsorption.

EXAMPLE 3

After grinding the glass-like composition as produced in Example 1 to a fine powder, 0.25 gram of this powder was further ground with 20 grams of cobalt molybdate as produced in Example 2. The powdered mixture was oven dried overnight at 110° C. and then calcined in air at 550° C. for 24 hours. The resulting mixture was a purple granular material of about 10 to 20 mesh size. The X-ray diffraction pattern of this product was identical to the pattern of the starting cobalt molybdate.

EXAMPLE 4

A hick homogeneous paste was formed by grinding in water 20 grams of cobalt molybdate as prepared in Example 2 and 0.25 gram of molybdenum ditelluride. This paste was oven dried at 110° C. for 16 hours and calcined in air at 550° C. for 24 hours. The X-ray diffraction pattern of this product was identical to the pattern of the initial cobalt molybdate. The resulting product was determined to be a mixture of cobalt molybdate and a molybdenum-tellurium-oxygen glass having the same composition as the material prepared in Example 1. It had a surface area of 3.68 M.$^2$/g. as determined by krypton adsorption.

EXAMPLE 5

A supported catalyst was made by grinding in water 20 grams of cobalt molybdate as prepared in Example 2 wtih 0.5 gram of molybdenum ditelluride until a thick homogeneous paste was formed. Approximately one- third of this paste was incorporated into 150 grams of a commercially available form of an alpha alumina having a surface area of 0.2 M.$^2$/g. by slurrying the two together. The slurry was oven dried overnight at 110° C. and then calcined in air at 600° C. for 24 hours. The resulting granular powder consisted of about 4.2 weight percent cobalt molybdate, about 0.11 weight percent of a molybdenum-tellurium-oxygen glass having the same composition as the material prepared in Example 1, and the remainder alpha alumina.

EXAMPLE 6

A supported catalyst was produced in the same manner as described in Example 5 except that 0.5 gram of the glass-like material as produced in Example 1 was powdered and used in place of molybdenum ditelluride. The resulting granular powder had a surface area of 0.74 M.$^2$/g. It consisted of cobalt molybdate, the glass, and alpha alumina.

EXAMPLE 7

A 1.01-gram sample of vanadium ditelluride powder, VTe$_2$, was slowly heated in a crucible in air to a maximum temperature of 900° C. over a period of about three hours and was held at this temperature for an additional 16 hours. The dark black VTe$_2$ powder was converted to a dark black mass which was sufficiently fluid at 643° C. to creep slowly when the crucible was tilted. It solidified upon cooling to a glassy material weighing 1.41 grams. The glass was ground to a fine powder and its stoichiometry was determined to be 26 weight percent vanadium, 43 weight percent tellurium, and the remainder oxygen by X-ray fluorescence, neutron activation analysis, and gravimetric techniques. If a free oxide of tellurium were present, it would be expected to be tellurium dioxide, however, the preparation was carried out at a temperature above the sublimation temperature of tellurium dioxide. Vanadium ditelluride and the oxides of vanadium and tellurium form distinct and characteristic X-ray diffraction patterns. X-ray diffraction analysis of the powdered glassy product disclosed that it was amorphous to X-rays and that none of the crystalline oxides of vanadium or tellurium or vanadium ditelluride or the free elements was detected. Supported and unsupported catalysts were made by procedures equivalent to Examples 3 to 6 using the product of this example or vanadium ditelluride as appropriate.

EXAMPLE 8

A 1.27-gram sample of tungsten ditelluride powder, WTe$_2$, (analyzed to contain 42 weight percent tungsten, theoretical 41.9 percent) was heated in a crucible in air from room temperature to a maximum temperature of 900° C. over a period of about three hours and was held at this temperature for an additional 16 hours. The gray WTe$_2$ powder was converted to a dark yellow mass which was fluid at 645° C. It solidified upon cooling to a glassy material weighing 1.51 grams. The glass was ground to a fine powder and the tungsten was determined to be 25.8 weight percent, tellurium was determined to be 55.2 weight percent and the remainder oxygen by neutron activation analysis, by X-ray fluorescence and by gravimetric techniques. If a free oxide of tellurium were present, it would be expected to be tellurium dioxide, however, the preparation was carried out at a temperature above the sublimation temperature of tellurium dioxide. Tungsten ditelluride and the oxides of tungsten and tellurium form distinct and characteristic X-ray diffraction patterns. X-ray diffraction analysis of the powdered glassy product disclosed that it was amorphous to X-rays and that none of the crystalline oxides of tungsten or tellurium or tungsten ditelluride or the free elements was detected. The composition was determined to be a chemical combination of tungsten, tellurium and oxygen containing 19 weight percent oxygen, 26 weight percent tungsten and 55 weight percent tellurium. Supported and unsupported catalysts were made by procedures equivalent to Examples 3 to 5 using the product of this example or tungsten ditelluride as appropriate.

EXAMPLE 9

A 3.17-gram sample of lead ditelluride powder, $PbTe_2$, was slowly heated in a crucible in air to a maximum temperature of 900° C. over a period of about three hours and was held at this temperature for an additional 16 hours. The $PbTe_2$ powder was converted to a yellow-green mass which was sufficiently fluid at 640° C. to creep slowly when the crucible was tilted. It solidified upon cooling to a glassy material weighing 3.89 grams. The glass was ground to a fine powder and its stoichiometry was determined to be 50.65 weight percent lead, 35.60 weight percent tellurium, and the remainder oxygen (13.75 percent) by X-ray fluorescence, neutron activation analysis, and gravimetric techniques. If a free oxide of tellurium were present, it would be expected to be tellurium dioxide, however, the preparation was carried out at a temperature above the sublimation temperature of tellurium dioxide. Lead ditelluride and the oxides of lead and tellurium form distinct and characteristic X-ray diffraction patterns. X-ray diffraction analysis of the powdered glassy product disclosed that it was amorphous to X-rays and that none of the crystalline oxides of lead or tellurium or lead ditelluride or the free elements was detected. Supported and unsupported catalysts were made by procedures equivalent to Examples 3 to 6 using the product of this example or lead ditelluride as appropriate.

EXAMPLE 10

A series of runs were conducted to determine the catalytic activity of the solid materials of the preceding examples in the reaction of propylene with oxygen to produce acrolein and acrylic acid. The reactor was constructed to 22 mm. O.D. quartz tubing, 42 cm. in length, with a 5 mm. thermowell extending the length of the catalyst zone. The solid material undergoing test was mixed with an equal volume (10 cc.) of silicon carbide. Silicon carbide was placed above the catalyst bed to serve as a gas mixer and a preheat section. The reactor was heated by a tube furnace equipped with a temperature controller. Propylene and air were metered into the heating section where they were mixed with steam before contacting the catalyst. The feed streams consisted of 11 volume percent propylene, 55 volume percent air and 34 volume percent steam.

At the start of each run, air was slowly passed through the reactor while the catalyst was brought to the reaction temperature of 435° C. After one hour of pretreatment with air, the reactor was flushed with nitrogen for 15 minutes and then the propylene, air and steam were metered into the reactor at the specified rates at a total pressure of one atmosphere and a flow rate to provide a contact time with the catalyst of 3.3 seconds based on the total gas flow. The percent conversion and product distribution for two-hour runs are listed in Table II in which the products are specified in mol percent. The catalyst was cobalt molybdate as prepared in Example 2 and the promoter is described in Table II.

TABLE II

| Promoter | Conversion | Acrylic acid | Acrolein | Acetic acid | $CO_2$ |
|---|---|---|---|---|---|
| None | 23 | 28.0 | 30.9 | 11.0 | 30.0 |
| $TeO_2$, 2% | 45 | 50.3 | 28.5 | 4.2 | 17.0 |
| Mo glass [1] | 53 | 57.4 | 23.8 | 4.8 | 14.0 |
| Do.[2] | 58 | 58.6 | 28.8 | 1.6 | 11.0 |
| V glass [3] | 44.6 | 57.1 | 31.6 | 2.3 | 8.9 |
| Do.[4] | 47.6 | 52.8 | 33.7 | 2.1 | 11.4 |
| W glass [3] | 54.9 | 51.7 | 33.9 | 2.6 | 11.8 |
| Do.[4] | 56 | 43.2 | 43.1 | 1.2 | 12.6 |
| Pb glass [3] | 50.8 | 54.7 | 31.7 | 3.9 | 9.6 |
| Do.[4] | 44.1 | 56.5 | 22.2 | 5.0 | 16.3 |

[1] Catalyst prepared in Example 3.
[2] Catalyst prepared in Example 4.
[3] Catalyst prepared as in Example 3 using 0.2 gram of glass per 20 grams of cobalt molybdate.
[4] Catalyst prepared as in Example 4 using 0.2 gram of metal ditelluride per 20 grams of cobalt molybdate.

It was also ascertained that neither the metal ditelluride nor the metal tellurium-oxygen glass when used alone had any catalytic activity for the reaction. The data on the experiment using 2% tellurium dioxide was obtained before the catalyst had lost a significant amount of tellurium dioxide by volatilization.

EXAMPLE 11

The supported catalyst made as described in Example 5 was used in the reaction of propylene using the procedures, equipment and feed stream as described in Example 10 and 20 cc. of the catalyst unmixed with silicon carbide. Specific conditions and results are set forth in Table III in which the gas houryl space velocity is based on propylene. Selectivity to acrylic acid and acrolein was about 95 percent with no acetic acid produced by the reaction.

TABLE III

| | Temp., ° C. | Conversion, percent | Acrolein to acrylic acid mol ratio |
|---|---|---|---|
| GHSV: | | | |
| 120 | 425 | 16.8 | 7.5 |
| 60 | 425 | 30.6 | 3.3 |
| 30 | 425 | 44.6 | 2.2 |
| 30 | 475 | 47.7 | 0.54 |

This example further demonstrates that the mol ratio of acrylic acid to acrolein is increased by an increase in the contact time of the feed stream with the promoted catalyst and by an increase in temperature. Although the mol ratio of acrylic acid to acrolein is increased with an increase in the temperature of this reaction, it is also accompanied with a significant increase in the aging of the catalyst.

It is to be understood that the above disclosure is by way of specific example and that numerous modifications and variations are available to those of ordinary skill in the art without departing from the true spirit and scope of our invention.

What is claimed is:

1. The promoted catalyst composition comprising from about 80 to about 99.9 weight percent cobalt molybdate and from about 0.1 to about 20 weight percent of an amorphous glass-like composition recovered from a process which comprises heating a metal ditelluride in which the metal is molybdenum, vanadium, tungsten or lead in the presence of molecular oxygen at a temperature at which said metal ditelluride is oxidized; wherein said temperature is between about 250° C. and about 700° C. when said metal ditelluride is molybdenum ditelluride, and between about 500° C. and about 1000° C., when said metal ditelluride is vanadium, tungsten or lead ditelluride.

2. The promoted catalyst composition of claim 1 comprising from about 90 to about 99.5 weight percent cobalt molybdate and from about 0.5 to about 10 weight percent of the amorphous glass-like composition.

References Cited
UNITED STATES PATENTS
| | | | |
|---|---|---|---|
| 3,065,264 | 11/1962 | Koch et al. | 260—533 N |
| 3,098,102 | 7/1963 | Bethell et al. | 260—533 N |
| 3,405,172 | 10/1968 | Brown et al. | 260—533 N |
| 3,467,716 | 9/1969 | Kiff et al. | 260—533 N |
| 3,475,488 | 10/1969 | Korata et al. | 260—533 N |
| 3,527,716 | 9/1970 | Nemer et al. | 260—533 N |
| 3,578,707 | 5/1971 | Bethell et al. | 252—470 |

DANIEL E. WYMAN, Primary Examiner

P. E. KONOPKA, Assistant Examiner

U.S. Cl. X.R.

252—470; 260—530 N, 533 N, 604 R